Patented June 19, 1934

1,963,934

UNITED STATES PATENT OFFICE 1,963,934

VINYLETHINYL DERIVATIVES AND PROCESSES FOR PRODUCING SAME

Wallace H. Carothers, Fairville, Pa., and Ralph A. Jacobson, Wilmington, Del., assignors to E. I. du Pont de Nemours & Company, Wilmington, Del., a corporation of Delaware No Drawing. Application November 11, 1931, Serial No. 574,359

25 Claims. (Cl. 260—16)

This invention relates to certain new and useful organo-metallic compounds and to methods of preparing them. More particularly it relates to the preparation of vinyl acetylides, compounds having the general formula $$CH_2=CH-C\equiv CM$$

in which M is an alkali metal. No compounds of this class have been described hitherto. We have found that it is possible by methods which are fully set forth below to obtain compounds of this class, and we have found further that these compounds react smoothly with an extraordinary variety of substances to produce derivatives containing the vinylethinyl group, and they thus make accessible a great many types of compounds that have in the past been difficult or impossible to prepare.

An object of the present invention relates to alkali metal derivatives of monovinyl acetylene and their method of preparation. A further object of the invention pertains to the preparation of numerous compounds obtained from such metallic derivatives. A further object of the invention comprehends various new chemical compounds produced by acting upon the alkali metal derivatives of monovinyl acetylene with certain reactants.

The starting material from which the products of the present invention are derived is monovinyl acetylene, $$CH_2=CH-C\equiv CH.$$

This compound, a gas boiling at about 6° C., is conveniently prepared in any desired quantity by a method described by J. A. Nieuwland in his U. S. application, Serial No. 305,866, filed September 13, 1928, U. S. Patent No. 1,811,959.

According to the method of the present invention we prepare vinylacetylides of the alkali metals by treating monovinyl acetylene with an alkali metal or an alkali metal amide. Reaction proceeds according to the following equations:

(1) 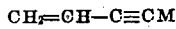 $2CH_2=CH-C\equiv C-H+2M \rightarrow 2CH_2=CH-C\equiv CM+H_2$ (2) $CH_2=CH-C\equiv CH+MNH_2 \rightarrow CH_2=CH-C\equiv CM+NH_3$ To carry out the preparation of an alkali vinylacetylide according to the first of these methods we have only to bring the vinyl acetylene into contact with the alkali metal. This may be done by adding the alkali metal to the liquid vinyl acetylene or to a solution such as an ethereal or a benzene solution of the vinyl acetylene. Or the alkali metal may be dissolved in liquid ammonia and the vinyl acetylene slowly added to this solution. The preparation of the alkali metal vinylacetylides by the direct action of the alkali metal on vinyl acetylene, however, is sometimes accompanied by side reactions apparently consisting for the most part in polymerization of the vinyl acetylene or its alkali metal derivative, and the alkali metal acetylide is then contaminated with by-products from which it is not readily freed. For this reason our generally preferred method of preparing vinylacetylides of the alkali metals is that represented by the second equation.

According to this method we bring together monovinyl acetylene with an alkali metal amide such as lithium amide, sodium amide, potassium amide, rubidium amide, caesium amide, etc., either in the presence of a solvent or diluent or not. This method is illustrated by the following example.

EXAMPLE I

*Preparation of sodium vinylacetylide*

Nineteen and five tenths grams (0.5 mol) powdered sodamide was slowly added to a solution of 75 g. monovinyl acetylene in 250 cc. liquid ammonia and the mixture stirred for six hours. The ammonia was evaporated in a current of nitrogen and the solid residue warmed to 60° C. in an atmosphere of nitrogen. The sodium vinylacetylide obtained in this manner was a white powder of great reactivity. When heated in the presence of air, it ignited spontaneously, and in the absence of an inert diluent, it reacted explosively with many types of compounds. Analysis of the acetylide by careful decomposition with water showed that at least 82% of the monovinyl acetylene was regenerated. Instead of liquid ammonia, other inert solvents such as ethyl ether, butyl ether, or hydrocarbons may be employed.

It is also possible to prepare sodium vinylacetylide by allowing gaseous monovinyl acetylene to act directly on sodamide.

The preparation 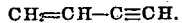 of other alkali vinylacetylides such as lithium vinylacetylide and potassium vinylacetylide can also be carried out by using lithium amide and potassium amide in place of sodium amide as illustrated above. These vinylacetylides are also white powders insoluble in hydrocarbon solvents and very reactive toward air, carbon dioxide, water, etc. When carefully protected from the action of air, moisture, etc., they may however be stored for a considerable period of time without deterioration.

Under suitably regulated conditions the vinylacetylides of the alkali metals react very smoothly with a great variety of compounds to produce derivatives containing the vinylethinyl group. which M represents an alkali metal, e. g., Na, K, Li:

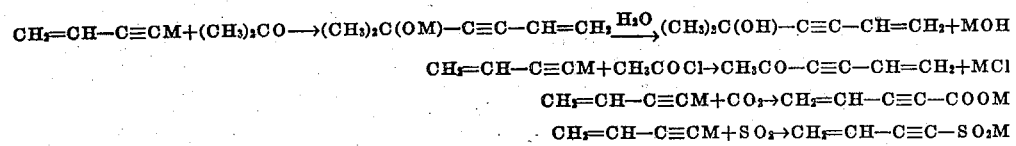

For this purpose it is not necessary, and in general it is not desirable to isolate the vinylacetylides as such. Instead the reaction mixture in which they are formed may be treated directly with the material with which it is desirable to cause them to react.

We have found that the vinylacetylides of the alkali metals resemble rather closely the vinylethinyl magnesium compounds in the nature of their reactions. These latter compounds and their method of preparation are described in a copending application of Carothers and Berchet, Serial No. 574,456, filed November 11, 1931. The chief difference between the two types of compounds is that the vinylacetylides of the alkali

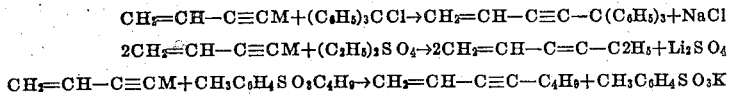

metals are much more reactive. Thus the magnesium compounds show comparatively little tendency to react with ordinary alkyl halides such as n-butyl bromide, whereas the alkali compounds react almost instantly with such halides even at temperatures as low as −30° C.

According to the present invention we prepare compounds containing the vinylethinyl group by allowing a reactant to act upon the vinylacetylide of an alkali metal. As reactants we may use unsaturated compounds of the character described in the Carothers and Berchet copending application, referred to above, as being reactive with vinylethinyl magnesium compounds, namely, compounds containing the nuclei $$A=B \text{ or } A\equiv B$$

in which A and B represent atoms of two different elements which are mutually united by more than one "covalent" bond. By a "covalent" bond we means a pair of shared electrons. This is discussed on page 83, et seq., of Sidgwick—The Electronic Theory of Valence, Oxford University Press, Oxford, 1927. Thus we may use as reactants aldehydes, such as formaldehyde, acetaldehyde, butyraldehyde, heptaldehyde, benzaldehyde, etc., ketones, such as acetone, methyl ethyl ketone, methyl heptyl ketone, acetophenone, benzophenone, etc., carboxylic acids such as acetic acid, benzoic acid, etc., esters of carboxylic acids, such as ethyl acetate, diethyl succinate, methyl butyrate, ethyl benzoate, etc., acid chlorides, such as acetyl chloride, butyryl chloride, benzoyl chloride, etc., carbon dioxide, carbon monoxide, nitriles, such as acetonitrile, capronitrile, benzonitrile, etc., isocyanates, such as methyl isocyanate, phenyl isocyanate, naphthyl isocyanate, etc., isothiocyanates, such as ethyl isothiocyanate, octyl isothiocyanate, etc., sulfur dioxide, etc.

The nature of some of these reactions is illustrated by the following typical equations in We may also use as reactants organic halides such as triphenylchloromethane, benzyl chloride, allyl bromide, ethyl iodide, heptyl chloride, butyl bromide and esters of sulfuric acid such as diethyl sulfate, dipropyl sulfate, dimethyl sulfate, and esters of aryl sulfonic acids such as butyl p-toluene sulfonate, ethyl xylenesulfonate, amyl benzenesulfonate. The course of these reactions is illustrated by the following equations:

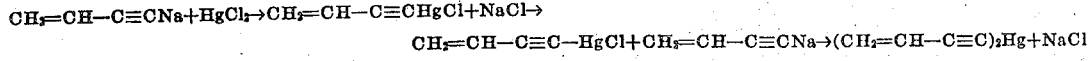

We may also use as reactants halides of other elements than carbon including halides of mercury, silicon, germanium, tin, phosphorus, arsenic, antimony and bismuth. The nature of the action of the vinyl acetylide of the alkali metals on the halides is illustrated by the following equation:

$$CH_2=CH-C\equiv CNa+HgCl_2\rightarrow CH_2=CH-C\equiv CHgCl+NaCl\rightarrow$$
$$CH_2=CH-C\equiv C-HgCl+CH_2=CH-C\equiv CNa\rightarrow(CH_2=CH-C\equiv C)_2Hg+NaCl$$

It should be mentioned that vinylethinyl compounds containing two or more vinylethinyl groups show a great tendency to polymerize, and this tendency in certain cases is so great as to make it difficult or impossible to isolate the compound as such in an unpolymerized state.

The reactant and the alkali vinyl acetylide may be brought together in any appropriate manner consistent with the physical properties of the reacting materials as will be fully illustrated below. In this connection it is necessary to take into account the extraordinary reactivity of the alkali vinyl acetylides. This great reactivity makes it desirable to have the reactants and any solvents that may be used in connection with them as dry as possible and free of alcohols, acids, etc. In general it is necessary to bring the reactant and the alkali vinyl acetylide together slowly, e. g., by adding the reactant in portions to the alkali compound, or by adding the alkali compound in portions to the reactant. In this connection it may be observed that the alkali vinyl acetylides although they are rather inflammable, and although they deteriorate considerably after a time when freely exposed to the air, are nevertheless sufficiently stable to be handled as such in the powder form. In general, however, it is more convenient and more satisfactory not to attempt to isolate the alkali vinyl acetylide as such, but to use it directly in the presence of the medium in which it is prepared. Thus if the vinylacetylide is made in the presence of liquid ammonia or dry ether or benzene, the reactant may be added directly to the ammonia, ether, or benzene in which the vinylacetylide is suspended. In most cases the presence of a liquid of this kind which may function as a solvent and diluent for the reaction is very advantageous since it moderates the vigor of the reaction and makes it possible to obtain thorough mixing which toward the end of the reaction may otherwise be difficult.

The reactions of the alkali vinylacetylides are in general not only very rapid but strongly exothermic, and for this reason it is usually desirable to arrange for a very thorough cooling of the vessel in which the reaction is carried out. Stirring is also advantageous especially since the alkali vinylacetylides are in general only slightly soluble in liquids that are sufficiently inert to serve as media for their reactions.

We have found that it is possible to carry out the reactions of the alkali vinylacetylides in such a way as to have them formed in the presence of the compound with which they are expected to react. To carry out reactions in this fashion the (liquid) monovinylacetylene is mixed with the reactant, and to the mixture is added, preferably with efficient stirring and in the presence or absence of a diluent such as ether, the finely divided alkali amide. Thus if it is desired to bring about the reaction of sodium vinyl acetylide with acetone, monovinylacetylene may be mixed with an equimolecular quantity of acetone together with an equal volume of dry ether, and an equimolecular quantity of finely powdered sodamide added in portions with stirring to the cooled mixture. It is probable that under these conditions the sodamide reacts with the vinyl acetylene to form sodium vinylacetylide which then reacts with the acetone almost as rapidly as it is formed. This method of carrying out the reaction is very convenient and in many cases gives exceptionally high yields of the expected products. It is possible also in many cases to add the sodamide to the reactant and then add the vinyl acetylene subsequently. Thus if one mol of acetone is mixed with one mol of sodamide and the mixture is then treated further with one mol of monovinyl acetylene, reaction proceeds smoothly with the formation of the same product that is obtained when acetone is treated directly with sodium vinyl acetylide. In this case the reaction probably proceeds by the mechanism represented by the following equations:

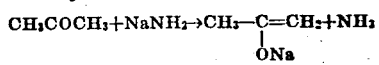

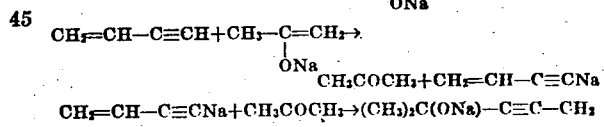

and finally $(CH_3)_2C(ONa)-C\equiv C-CH=CH_2+H_2O \rightarrow$
$(CH_3)_2C(OH)-C\equiv C-CH=CH_2+NaOH.$ And in any event in practice this method is equivalent to using sodium vinylacetylide as the reactant.

The following examples illustrate the method of the present invention and the nature of the products obtained.

Example II

*Preparation of vinylethinyl methyl ethyl carbinol*

The reaction mixture consisted of 555 g. (7.7 mols) methyl ethyl ketone, 551 g. (10.6 mols) monovinyl acetylene, and 500 cc. dry ether. The solution was contained in a 3-necked flask provided with a mercury-seal stirrer and a coil condenser, which in turn was connected to a trap. The reaction flask and trap were surrounded with carbon dioxide snow and the coil-condenser was kept cold in the same manner. To the cold solution was slowly added 300 g. (7.7 mols) powdered sodamide and the mixture stirred for a total of 6 hours. The reaction mixture was made acid to litmus by means of 10% sulfuric acid, the ether layer separated and dried with sodium sulfate, and then distilled in a vacuum. Six hundred seventy-seven grams of pure vinylethinyl methyl ethyl carbinol was obtained. This is a liquid $B_{20 mm}. 75° C., N_D^{20° C.}, 1.4802;$ $D\frac{20° C.}{4° C.}, 0.8878.$ Yield 71%.

The carbinol was stabilized with 0.1% hydroquinone in order to prevent spontaneous polymerization.

Vinylethinyl methyl ethyl carbinol readily absorbed the theoretical amount of hydrogen ($PtO_2$ catalyst) to give quantitatively the known saturated carbinol, methyl ethyl butyl carbinol.

$B_{762mm}.160.4-161° C.; D\frac{20° C.}{4° C.}, 0.8286;$ $N_D^{20° C.}, 1.4299$

Example III

*Preparation of vinylethinyl dimethyl carbinol*

A mixture composed of 15 mols of acetone and 18.8 mols of vinyl acetylene was placed in a refrigerated vessel provided with a stirrer and a reflux condenser. The mixture was vigorously stirred and during a period of two hours 16.5 mols of powdered sodamide was added in small portions. Stirring was continued for 4 hours longer and the mixture was then carefully treated with a large volume of water. The oily layer was separated, washed with a little dilute sulfuric acid and distilled. There was thus obtained 898 g. of liquid vinylethinyl dimethyl carbinol boiling at 67° C. at 24 mm.

Example IV

*Preparation of vinylethinyl methyl ethyl carbinol*

Potassium amide was prepared by dissolving 21 g. of potassium in 500 cc. of liquid ammonia and allowing the mixture to stand until the reaction was complete. The resulting suspension of potassium amide in liquid ammonia was placed in a flask cooled with solid carbon dioxide and provided with a mechanical stirrer and a reflux condenser. The suspension was treated first with 36 g. of methyl ethyl ketone, and then with 36 g. of monovinyl acetylene. The resulting mixture was stirred for one hour and then the ammonia was allowed to evaporate. The residue was treated with ice water and cold dilute sulfuric acid, and the oily layer separated, dried and distilled. There was thus obtained 36.5 g. (50% of the theory) of liquid vinylethinyl methyl ethyl carbinol having the properties already described in Example II.

Example V

Three and one-half parts of metallic lithium were dissolved in 500 parts of liquid ammonia, and the resulting blue solution was treated with methyl ethyl ketone and monovinyl acetylene as in Example IV. In this case a 35% yield of liquid vinylethinyl methyl ethyl carbinol was obtained.

By the general method described in Example II, the carbinols described in Examples VI to XV have been prepared.

Example VI

*Vinylethinyl dimethyl carbinol*

This compound was prepared in a 74.5% yield by the interaction of monovinyl acetylene, acetone and sodamide. It is a liquid.

$B_{24mm}.67°$ C.; $N_D^{20°C.}$ 1.4778; $D\frac{20°C.}{4°C.}$ 0.8872

The unsaturated alcohol was readily reduced by hydrogen. (PtO$_2$ catalyst) to give quantitatively, the saturated carbinol, dimethyl butyl carbinol. It is a liquid.

$B_{762mm}.141.5-142°$ C.; $D\frac{20°C.}{4°C.}$ 0.8132; $N_D^{20°C.}$ 1.4200

Example VII

Vinylethinyl diethyl carbinol

This carbinol was prepared from monovinyl acetylene, diethyl ketone, and sodamide. It is a liquid.

$B_{4mm}.62°$ C.; $N_D^{20°C.}$ 1.4800; $D\frac{20°C.}{4°C.}$ 0.8875; yield 77%.

Example VIII

Vinylethinyl dipropyl carbinol

Vinylethinyl dipropyl carbinol was obtained by the interaction of monovinyl acetylene, dipropyl ketone, and sodamide. It is a liquid.

$B_{22mm}.98-99°$ C.; $D\frac{20°C.}{4°C.}$ 0.8738; $N_D^{20°C.}$ 1.4745; yield 47.9%

Example IX

Vinylethinyl methyl octyl carbinol

This compound resulted from the condensation of methyl octyl ketone and monovinyl acetylene by means of sodamide. It is a liquid.

$B_{5mm}.98.5-99.5°$ C.; $D\frac{20°C.}{4°C.}$ 0.8681; $N_D^{20°C.}$ 1.4734; yield 41+%.

Catalytic reduction (PtO$_2$ catalyst) gave quantitatively the saturated carbinol, methyl butyl octyl carbinol, a liquid.

$B_{3mm}.94°$ C.; $D\frac{20°C.}{4°C.}$ 0.8318; $N_D^{20°C.}$ 1.4418.

Example X

1-vinylethinyl cyclopentanol

The condensation of cyclopentanone and monovinyl acetylene by means of sodamide resulted in a 32% yield of 1-vinylethinyl cyclopentanol liquid.

$B_{7mm}.104-105°$ C.; $N_D^{20°C.}$ 1.5228; $D\frac{20°C.}{4°}$ 1.0181.

Example XI

1-vinylethinyl cyclohexanol

This compound was prepared in a 50% yield from cyclohexanone, monovinyl acetylene, and sodamide. It is a liquid.

$B_{2mm}.84-85°$ C.; $D\frac{20°C.}{4°C.}$ 0.9742; $N_D^{20°C.}$ 1.5169

Example XII

Vinylethinyl methyl phenyl carbinol

This carbinol was obtained in 50+% yield from acetophenone, monovinyl acetylene, and sodamide.

$B_{4mm}.125-126°$ C.; M. P. 40-41° C.

Example XIII

Vinylethinyl diphenyl carbinol

The condensation of benzophenone and monovinyl acetylene by means of sodamide gave a brown, transparent, brittle resin. Yield 21+%.

Example XIV

Vinylethinyl methyl carbinol $(CH_2=CH-C\equiv C-CH(OH)CH_3)$

This carbinol was obtained in a 26% yield by the action of sodamide upon a mixture of acetaldehyde and monovinyl acetylene. It is a liquid.

$B_{22mm}.65°$ C.; $N_D^{20°C.}$ 1.4851; $D\frac{20°C.}{4°C.}$ 0.9112.

Considerable amounts of brown resin were also formed.

Example XV

Vinylethinyl propyl carbinol $(CH_2=CH-C\equiv C-CH(OH)C_3H_7)$

This carbinol was obtained in 25% yield by the interaction of butyraldehyde, monovinyl acetylene and sodamide.

$B_{10mm}.74-76°$ C.; $N_D^{20°C.}$ 1.4775; $D\frac{20°C.}{4°C.}$ 0.8920.

Higher boiling liquids were also obtained.

Example XVI

Reaction of crotonaldehyde, monovinyl acetylene, and sodamide

A brown transparent resin was obtained from this reaction.

Example XVII

Reaction of acrolein, monovinyl acetylene, and sodamide

A pale-yellow, amorphous, polymeric solid was obtained from this reaction.

Example XVIII

Reaction of furfuraldehyde, monovinyl acetylene and sodamide

The products of this reaction were furoic acid, and a brown resin.

As further illustrating the general applicability of aldehydes, stearaldehyde, benzaldehyde and naphthaldehyde may be used in lieu of those specifically disclosed in several of the above examples.

The action of sodium vinyl acetylide on an alkyl ester of sulfuric acid is illustrated in Examples XIX and XX.

Example XIX

Methyl vinyl acetylene $(CH_2=CH-C\equiv C-CH_3)$

Fifty-eight and five tenths grams (1.5 mol) powdered sodamide was slowly added to a solution of 104 g. monovinyl acetylene in 300 cc. liquid ammonia contained in a suitable apparatus. After 3 hours, 189 g. (1.5 mols) dimethyl sulfate was slowly added to the mixture. Vigorous reaction occurred as the dimethyl sulfate dropped into the mixture. After evaporation of the ammonia, the methyl vinyl acetylene was distilled from the reaction flask. The yield of liquid methyl vinyl acetylene was 38%.

$B_{759.5mm}$ 59.2° C.; $N_D^{20°C.}$ 1.4496; $D\frac{20°C.}{4°C.}$ 0.7401

EXAMPLE XX

Ethyl vinyl acetylene $(CH_2=CH-C\equiv C-C_2H_5)$

This compound was prepared from sodium vinyl acetylide and diethyl sulfate by the above procedure. Yield 42.5%.

$B_{753mm}$ 84.5–85.3° C.; $N_D^{20°C.}$ 1.4522;

$D\frac{20°C.}{4°C.}$ 0.7492.

Dipropyl and dibutyl sulfates, as well as numerous other organic sulfates may be used in a manner similar to that described in connection with the dimethyl and diethyl sulfates.

The action of sodium vinyl acetylide on an ester of p-toluene sulfonic acid is illustrated in Example XXI.

EXAMPLE XXI

One hundred four grams of monovinyl acetylene was dissolved in 200 cc. of n-butyl ether and the thoroughly cooled mixture was slowly treated with stirring with 58.5 g. of powdered sodamide. After the completion of the reaction 300 g. of ethyl p-toluene sulfonate dissolved in 200 cc. of butyl ether was slowly added to the mixture during the course of several hours. The mixture was finally heated for a time on the water bath. It was then treated with cold water and dilute sulfuric acid, the ethereal layer was separated, dried, and distilled. The distillate yielded 28.5 g. of ethyl vinyl acetylene (24% of the theory) identical in its properties with the material described in Example XX.

Other sulphonates, e. g. methyl benzene sulfonate, butyl xylene sulfonates, benzyl p-toluene sulfonate, and the like, will react similarly to ethyl p-toluene sulphonate.

The action of sodium vinyl acetylide on an alkyl halide is illustrated in Examples XXII and XXIII.

EXAMPLE XXII

Butyl monovinyl acetylene $(CH_2=CH-C\equiv C-C_4H_9)$

To a solution of 75 g. monovinyl acetylene in 400 cc. liquid ammonia was slowly added 39 g. (1 mol) powdered sodamide. After 3 hours, 137 g. of butyl bromide (1 mol) was slowly added during the course of 4 hours. The mixture was allowed to stand overnight during which the ammonia evaporated. Water and dilute sulfuric acid were added, the upper layer separated, dried with calcium chloride and distilled. Yield of butyl monovinyl acetylene, 65%.

$B_{50mm}$ 59–60° C.; $D\frac{20°C.}{4°C.}$ 0.7830; $N_D^{20°C.}$ 1.4592.

EXAMPLE XXIII

Heptyl monovinyl acetylene $(CH_2=CH-C\equiv C-C_7H_{15})$

This compound was prepared from sodium vinylacetylide and heptyl bromide by the procedure described in Example XXII. Yield 52%.

$B_{7mm}$ 74.5° C.; $N_D^{20°C.}$ 1.4606; $D\frac{20°C.}{4°C.}$ 0.7962

The vinylethinyl carbinols described in Examples II–XV are colorless liquids or crystalline solids having pleasant odors. They can be readily polymerized to yield clear, tough, transparent resins. They are readily hydrogenated to the corresponding saturated carbinols having the general formula.

$R(R_1)C(OH)CH_2CH_2CH_2CH_3$

The following example illustrates a general method of hydrogenating the vinylethinyl carbinols.

EXAMPLE XXIV

Hydrogenation of vinylethinyl carbinols

Twenty g. of vinylethinyl dimethyl carbinol, produced by the process outlined in Examples III and VI, are dissolved in 75 cc. of alcohol and mixed with 0.4 g. of platinum oxide catalyst and shaken with hydrogen at 2 atmospheres pressure for 45 minutes. It absorbs 95% of the calculated amount of hydrogen. Distillation of the liquid reaction mixture gives an excellent yield of dimethyl-n-butyl carbinol.

In a similar manner, the other vinylethinyl carbinols may be hydrogenated to yield nonsaturated carbinols. Thus the hydrogenation of methyl ethyl vinylethinyl carbinol yields methyl ethyl n-butyl carbinol; the hydrogenation of methyl n-octyl vinylethinyl carbinol yield methyl n-octyl n-butyl carbinol, a new compound boiling at about 94° C. at 3 mm. and having a density of 20° C. of 0.832; and the hydrogenation of methyl phenyl vinylethinyl carbinol yields the new compound methyl phenyl n-butyl carbinol, a liquid boiling at 107–109° C. at 6 mm. and having a density at 20° C. of 0.962.

Examples XIX to XXIII illustrate the synthesis of alkyl substituted monovinylacetylenes by reacting an alkali metal vinyl acetylide with a non-carboxylic acid ester. The process is applicable to the formation of substituted monovinyl acetylenes containing organic radicals other than alkyl, e. g. aralkyl, by using an ester other than an alkyl ester. These hydrocarbons are new compounds and constitute important starting materials for the preparation of valuable synthetic derivatives having great utility in the arts. They readily polymerize under the influence of common polymerizing agents, for example, oxygen (air), light, pressure, elevated temperature, oxidation catalysts, etc., to form polymers varying from viscous, transparent liquids to resinous solids. The polymers vary in color from a light yellow to a deep brown, and are transparent.

The above description and specific examples are capable of considerable variation without departing from the spirit of the invention. Any modification which conforms to the concept of the invention is intended to be included within the scope of the claims.

We claim:

1. The process of producing chemical compounds which comprises reacting monovinylacetylene with a member of the group consisting of alkali metals and alkali metal amides.

2. The process of producing chemical compounds which comprises reacting monovinylacetylene with an alkali metal amide.

3. The process of producing sodium vinylacetylide which comprises reacting monovinylacetylene with a member of the group consisting of sodium and sodamide.

4. The process of producing sodium vinylacetylide which comprises reacting monovinylacetylene with sodamide.

5. The process of producing chemical compounds which comprises reacting in the liquid state monovinylacetylene with a member of the group consisting of alkali metals and alkali metal amides.

6. As new chemical compounds, alkali metal vinyl acetylides.

7. As a new chemical compound, sodium vinyl acetylide.

8. The process of producing chemical compounds which comprises reacting an alkali metal vinyl acetylide with a Grignard reactive compound containing atoms of two different elements joined by more than one bond.

9. A polymer of a compound, said compound being produced according to the process of claim 8.

10. The process which comprises polymerizing a compound, said compound being produced according to the process of claim 8.

11. The process of producing chemical compounds which comprises reacting an alkali metal vinyl acetylide with a compound containing atoms of two different elements joined by more than one bond, said compound being of the group consisting of aldehydes, ketones, nitriles, carboxylic acid esters, carbon dioxide, isocyanates, isothiocyanates and sulfur dioxide.

12. A polymer of a compound, said compound being produced according to the process of claim 11.

13. The process which comprises polymerizing a compound, said compound being produced according to the process of claim 11.

14. The process of producing chemical compounds which comprises reacting an alkali metal vinyl acetylide with a compound containing a carbonyl group.

15. The process of producing chemical compounds which comprises reacting an alkali metal vinyl acetylide with an aldehyde, then subjecting the product to hydrolysis.

16. The process of producing chemical compounds which comprises reacting an alkali metal vinyl acetylide with a ketone, then subjecting the product to hydrolysis.

17. The process of producing chemical compounds which comprises reacting an alkali metal vinyl acetylide with an aldehyde, then subjecting the product to hydrolysis, and subsequently reacting with hydrogen.

18. The process of producing chemical compounds which comprises reacting an alkali metal vinyl acetylide with a ketone, then subjecting the product to hydrolysis, and subsequently reacting with hydrogen.

19. The process which comprises reacting a vinyl ethinyl carbinol with hydrogen.

20. The process which comprises reacting vinylacetylene with a member of the group consisting of alkali metals and alkali metal amides, then treating the reaction product with a Grignard reactive compound containing atoms of two different elements joined by more than one bond.

21. The process which comprises reacting vinylacetylene with a member of the group consisting of alkali metals and alkali metal amides, and then treating the reaction product with a compound containing atoms of two different elements joined by more than one bond, said compound being of the group consisting of aldehydes, ketones, nitriles, carboxylic acid esters, carbon dioxide, isocyanate, isothiocyanate and sulfur dioxide.

22. The process according to claim 21 further characterized in that the alkali metal amide is added to a mixture of the vinylacetylene and a member of the class consisting of aldehydes, ketones, nitriles, carboxylic acid esters, carbon dioxide, isocyanates, isothiocyanates and sulfur dioxide.

23. The process according to claim 21 further characterized in that the vinylacetylene is added to a mixture of an alkali metal amide and a member of the class consisting of aldehydes, ketones, nitriles, carboxylic acid esters, carbon dioxide, isocyanates, isothiocyanates and sulfur dioxide.

24. The process which comprises reacting a mixture containing an alkali metal amide, monovinylacetylene, and an aldehyde.

25. The process which comprises reacting a mixture containing an alkali metal amide, monovinylacetylene and a ketone.

WALLACE H. CAROTHERS.
RALPH A. JACOBSON.